United States Patent Office 3,658,784
Patented Apr. 25, 1972

3,658,784
MONOAZO DYES CONTAINING A
BENZOISOTHIAZOLE
Guenther Lange, Ludwigshafen, Germany, assignor to
Badische Anilin- & Soda-Fabrik Aktiengesellschaft,
Ludwigshafen (Rhine), Germany
No Drawing. Filed May 27, 1969, Ser. No. 828,387
Claims priority, application Germany, June 1, 1968,
P 17 69 503.3
Int. Cl. C09b 29/08
U.S. Cl. 260—158      3 Claims

ABSTRACT OF THE DISCLOSURE

Water-insoluble p-aminoazo dyes having an acetoacetoxyalkyl group on the amino nitrogen atom which are particularly useful for dyeing cellulose esters and synthetic linear polyesters.

---

This invention relates to water-insoluble p-aminoazo dyes having the general Formula I:

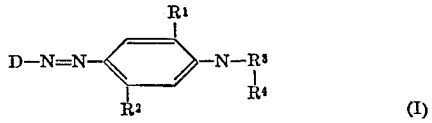

where
D denotes the radical of an amino of the thiazole, thiadiazole, benzothiazole or benzoisothiazole series;
$R^1$ denotes a hydrogen atom or a methyl, ethyl, methoxy or ethoxy group;
$R^2$ denotes a hydrogen or chlorine atom or a methyl, ethyl, methoxy, ethoxy, acetylamino or propionylamino group;
$R^3$ denotes a radical having the formula:

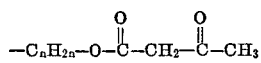

$R^4$ denotes a radical having the formula

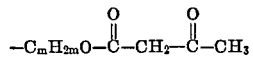

or the formula $-C_mH_{2m}-X$;

$n$ denotes one of the integers 2, 3 and 4;
$m$ denotes one of the integers 1, 2, 3 and 4; and
X denotes a hydrogen atom or a hydroxy, cyano, methoxy or ethoxy group.

Examples of amine or diazo components from which the radical D is derived are:

2-amino-5-phenylthiadiazole-1,3,4,
2-amino-5-ethylthiadiazole-1,3,4,
2-amino-5-(4'-chlorophenyl)-thiadiazole-1,3,4,
2-amino-4-methylmercaptothiadiazole-1,3,5,
5-nitro-2-aminothiazole, 2-aminobenzothiazole,
2-amino-6-methoxybenzothiazole,
2-amino-6-methylsulfonylbenzothiazole,
2-amino-6-carbethoxybenzothiazole,
3-aminobenzoisothiazole-1,2,
3-amino-5-nitrobenzoisothiazole-1,2 or
3-amino-5-nitro-7-bromobenzoisothiazole-1,2.

Examples of radicals $R^4$ which are different from $R^3$ are: methyl, ethyl, n-propyl, isopropyl, n-butyl, isobutyl, β-hydroxyethyl, β-cyanoethyl, β-methoxyethyl, β-ethoxyethyl, γ-hydroxypropyl or γ-methoxypropyl.

Examples of aniline derivatives having the general Formula II:

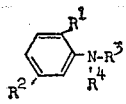

where $R^1$, $R^2$, $R^3$ and $R^4$ have the meanings given above and which are contained in the dyes having the Formula I as coupling components are:

N-(acetoacet-β-hydroxyethyl)-N-methylaniline,
N-bis-(acetoacet-β-hydroxyethyl)-aniline,
N-(acetoacet-ω-hydroxybutyl)-N-ethylaniline,
N-(acetoacet-β-hydroxyethyl)-N-β-cyanoethylaniline,
N-(acetoacet-β-hydroxyethyl)-N-β-hydroxyethylaniline,
N-(acetoacet-β-hydroxyethyl)-N-β-methoxyethylaniline,
N-(acetoacet-β-hydroxyethyl)-N-ethyl-m-toluidine,
N-(acetoacet-β-hydroxyethyl)-N-ethyl-m-methoxyaniline,
2-methyl-5-ethoxy-N-(acetoacet-β-hydroxyethyl)-N-ethylaniline, or
N-(acetoacet-β-hydroxyethyl)-N-β-hydroxyethyl-m-acetylaminoaniline.

Diazo components derived from the benzoisothiazoles-1,2 are preferred.
Particularly preferred dyes have the general Formula III:

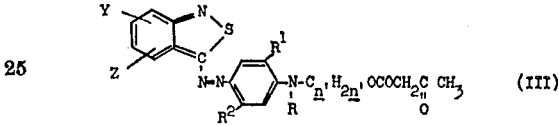

where
Z denotes a hydrogen, chlorine or bromine atom or a nitro, methylsulfonyl, carbomethoxy or carboethoxy group;
Y denotes a hydrogen or bromine atom;
$n'$ denotes one of the integers 2 and 3; and
$R^1$, $R^2$ and $R^4$ have the meanings given above.

Of the compounds having the Formula III those are preferred which have the general formula:

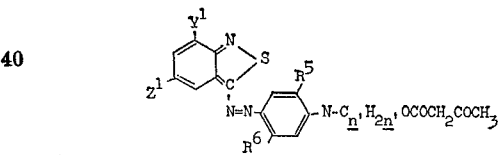

where
$Z^1$ denotes a bromine atom or a nitro group;
$Y^1$ denotes a hydrogen or bromine atom;
$R^5$ denotes a hydrogen atom or a methoxy or ethoxy group;
$R^6$ denotes a hydrogen atom or a methyl or acetylamino group; and
$n'$ and $R^4$ have the meanings given above.

The new dyes having the Formula I may be obtained for example by reaction of diazo compounds of amines having the general Formula IV:

$$D-NH_2 \qquad (IV)$$

with coupling components having the Formula II.
Dyes having the general Formula V:

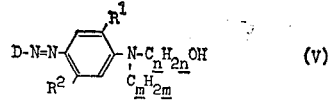

where D, $R^1$, $R^2$, $m$, $n$, and X have the meanings given above may also be reacted with compounds which yield the radical

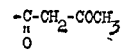

Examples of such compounds are alkyl acetoacetates, preferably methyl or ethyl acetoacetate or particularly diketene.

The new dyes are suitable, particularly in finely divided form, for dyeing and/or printing synthetic and cellulosic fibers such as polyesters, polyamides, polyamides, polyurethanes, polyvinyl chloride and particularly cellulose esters and ethers.

It is advantageous to use mixtures of the dyes according to this invention. These mixtures are for example obtained when diazo compounds of amines having the formula D—$NH_2$ are reacted with a mixture of coupling components having the Formula II which has been prepared by incomplete acylation of a starting component having the general Formula VI:

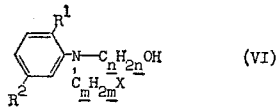 (VI)

or when dyes having the Formula V are incompletely acylated. Preferred compounds to be acylated are those in which X denotes a hydroxyl group.

The new dyes or dye mixtures give scarlet to blue dyeings which have excellent light and wet fastness and which are very resistant to gas-fume fading.

The invention is illustrated by the following examples in which the parts and percentages relate to weight.

EXAMPLE 1

7.3 parts of 2-amino-5-nitrothiazole is introduced into a mixture of 15 parts of nitrosylsulfuric acid (12.7% dinitrogen trioxide), 15 parts of sulfuric acid, 50 parts of glacial acetic acid and 50 parts of propionic acid. The whole is stirred for four hours and then the diazo solution is run into a coupling solution which has been prepared from 14.0 parts of N-acetoacet-β-hydroxyethyl-N-ethyl-m-toluidine, 10 parts of hydrochloric acid (10 moles/liter), 100 parts of water and 50 parts of ice, with another 600 parts of ice added after all has dissolved.

After the diazo solution has been run in, the whole is neutralized by adding 100 parts of caustic soda solution (10 moles/liter) to a pH value of 5 to 6. The dye formed is precipitated in crystalline form after having been stirred overnight. It is suction filtered, washed until neutral and dried at 50° C. at subatmospheric pressure. A clear reddish blue dyeing is obtained on acetate rayon.

EXAMPLE 2

A diazo solution is prepared analogously to Example 1 from 7.3 parts of 3-methylmercapto-5-aminothiadiazole-1,2,4 and is then added to a coupling solution which has been obtained by dissolving 15 parts of N-acetoacet-β-hydroxyethyl-N-β-cyanoethyl-m-toluidine in 50 parts of water with an addition of 20 parts of hydrochloric acid (10 moles/liter) followed by the addition of 300 parts of ice and 250 parts of ice water.

After the diazo solution has been added, the whole is neutralized to pH 5 with 100 parts of caustic soda solution (10 moles per liter). The product is processed as usual after being stirred overnight. 24 parts of a dye is obtained which gives bright scarlet dyeings on acetate rayon.

EXAMPLE 3

12 parts of 3-carbomethoxyethyl-5-aminothiadiazole-1,2,4 is introduced at from 10° to 15° C. into a mixture of 30 parts of sulfuric acid, 50 parts of glacial acetic acid. 15 parts of nitrosyl-sulfuric acid (12.7% of dinitrogen trioxide) is run in slowly and the diazo solution thus prepared is stirred for another four hours and then poured into a coupling solution which has been obtained by dissolving 14.5 parts of N-acetoacet-β-hydroxyethyl-N-β-cyanoethylaniline in 25 parts of hydrochloric acid (10 moles per liter) and 100 parts of water followed by the addition of 700 parts of ice and 200 parts of ice water.

After the diazo solution has been run in, the whole is neutralized with 120 parts of caustic soda solution (10 moles per liter) and stirred overnight, and the dye is isolated as usual. 20 parts of a powder is obtained which dyes acetate rayon bright scarlet shades.

EXAMPLE 4

9 parts of 2-amino-5-phenylthiadiazole-1,3,4 is introduced into a mixture of 50 parts of phosphoric acid, 15 parts of sulfuric acid and 15 parts of nitrosylsulfuric acid (12.7% of dinitrogen trioxide). After the diazo solution thus prepared has been stirred for four hours the diazo solution is added to a coupling solution which has been obtained by dissolving 13.5 parts of N-acetoacet-β-hydroxyethyl-N-ethylaniline in 10 parts of water and 50 parts of ice followed by an addition of 600 parts of ice.

When all the diazo solution has been added, the whole is further diluted with another 250 parts of ice water and neutralized to a pH value of from 5 to 6 by adding 140 parts of caustic soda solution (10 moles/liter). The whole is stirred overnight and the deposited precipitate is suction filtered, washed until neutral with water and dried at 50° C. at subatmospheric pressure. 15 parts of a powder is obtained which dyes acetate rayon bright scarlet shades.

EXAMPLE 5

5 parts of 2-methyl-4-bis-(β-hydroxyethyl)-aminoazobenzene is dissolved in 50 parts of methyl acetoacetate and stirred for four hours at from 120° to 130° C. The methanol formed is distilled off through a short column. Then the excess acetoacetic ester is withdrawn in a water jet vacuum. 7 parts of a red oil remains which crystallizes only after prolonged standing. The dye obtained dyes polyester cloth a clear orange.

EXAMPLE 6

10 parts of 3-amino-5-nitrobenzoisothiazole is dissolved at 10° C. in 100 parts of 85% sulfuric acid and diazotized by slow addition of 15 parts of nitrosylsulfuric acid (12% of dinitrogen trioxide).

The diazo solution thus prepared is stirred for four hours and then allowed to flow into a coupling solution which has been obtained by dissolving 14.5 parts of coupling components (prepared as described below) in 6 parts of hydrochloric acid (10 moles per liter) and 50 parts of ice water followed by addition of 400 parts of ice.

After the diazo solution has been added, the whole is diluted with 250 parts of ice water and adjusted to a pH value of from 5 to 6 by adding 225 parts of caustic soda solution (10 moles/liter). After conventional processing, 23 parts of a dye is obtained which dyes acetate rayon and polyester cloth pure blue shades.

Production of the coupling components 90.5 parts of N-di-β-hydroxyethylaniline has 70 parts of methyl acetoacetate added to it and is then heated first to 120° C. and then slowly to 160° C. The total duration of the heating is six hours. 18 parts of methanol distil over slowly. The whole is then cooled to 80° C. and a small amount (about 1 part) of unreacted methyl acetoacetate is removed at from 10 to 15 mm.

132 parts of a pale oil is obtained which contains N - (acetoacet - β-hydroxyethyl)-N-β-hydroxyethylaniline as main product and small amounts of corresponding diester and starting material. The molecular weight determined from coupling with nitrosoamine is 270.

The following coupling components (which contain N - (acetoacet-β-hydroxyethyl)-N-β-hydroxyethyl-m-toluidine or N-(acetoacet-β-hydroxyethyl)-N-β-hydroxyethyl-m-acetaminoaniline as main product) which are hereinafter described under the name of the main product are obtained in the same way from the appropriate starting materials.

Dyes characterized by the diazo and coupling components in the following table are obtained by a method analogous to that described in Examples 1 to 4.

In the following table, the Coupling Components (CC) used are as follows:

(1) N-(acetoacet-β-hydroxyethyl)-N-ethylaniline
(2) N-(acetoacet-β-hydroxyethyl)-N-cyanoethylaniline
(3) N-(acetoacet-β-hydroxyethyl)-N-cyanoethyl-m-toluidine
(4) N-(acetoacet-β-hydroxyethyl)-N-methoxyethylaniline
(5) N,N-di-(acetoacet-β-hydroxyethyl)-m-toluidine
(6) N-(acetoacet-β-hydroxypropyl)-N-cyanoethylaniline
(7) N-(acetoacet-β-hydroxyethyl)-N-benzyl-m-toluidine
(8) N-(acetoacet-β-hydroxyethyl)-N-benzylaniline
(9) N-(acetoacet-β-hydroxyethyl)-N-ethyl-m-toluidine
(10) N-(acetoacet-β-hydroxyethyl)-N-β-hydroxyethyl-m-toluidine
(11) N-(acetoacet-β-hydroxyethyl)-N-β-hydroxyethyl-m-acetoaminoaniline
(12) N-(acetoacet-β-hydroxy)-N-β-hydroxyethyl-3-chloroaniline
(13) N-(acetoacet-β-hydroxyethyl)-N-β-hydroxyethyl-2,5-dimethoxyaniline
(14) N-bis-(acetoacet-β-hydroxyethyl)-3-acetylaminoaniline

| Diazo component | CC | Shade on acetate rayon |
|---|---|---|
| 2-amino-5-nitrothiazole | (1) | Blue. |
|  | (2) | Do. |
|  | (3) | Violet. |
|  | (4) | Blue. |
|  | (5) | Do. |
|  | (6) | Violet. |
|  | (7) | Blue. |
|  | (8) | Violet. |
| 3-methylmercapto-5-aminothiadiazole-1,2,4 | (1) | Red. |
|  | (2) | Scarlet. |
|  | (4) | Red. |
|  | (5) | Red. |
|  | (6) | Scarlet. |
|  | (7) | Red. |
|  | (8) | Red. |
|  | (9) | Red. |
| 3-carbomethoxyethylmercapto-5-aminothiadiazole-1,2,4. | (1) | Red. |
|  | (3) | Red. |
|  | (4) | Red. |
|  | (5) | Red. |
|  | (6) | Red. |
|  | (7) | Red. |
|  | (8) | Red. |
|  | (9) | Ruby. |
| 2-amino-5-phenylthiadiazole-1,3,4 | (2) | Orange. |
|  | (3) | Red. |
|  | (4) | Red. |
|  | (5) | Red. |
|  | (6) | Orange. |
|  | (7) | Red. |
|  | (8) | Red. |
|  | (9) | Red. |
| 2-amino-6-methoxybenzothiazole | (1) | Ruby. |
|  | (2) | Orange. |
|  | (3) | Scarlet. |
|  | (4) | Red. |
|  | (5) | Red. |
|  | (6) | Orange. |
|  | (7) | Red. |
|  | (8) | Scarlet. |
|  | (9) | Red. |
| 3-amino-5-nitrobenzoisothiazole-2,1 | (1) | Blue. |
|  | (2) | Violet. |
|  | (3) | Blue. |
|  | (4) | Do. |
|  | (5) | Do. |
|  | (6) | Violet. |
|  | (7) | Blue. |
|  | (8) | Do. |
|  | (9) | Do. |
|  | (10) | Do. |
|  | (11) | Greenish blue. |
| 3-amino-5-nitro-7-bromobenzoisothiazole-2,1 | (1) | Blue. |
|  | (2) | Violet. |
|  | (3) | Do. |
|  | (4) | Blue. |
|  | (5) | Do. |
|  | (6) | Do. |
|  | (7) | Do. |
|  | (8) | Do. |
|  | (9) | Do. |

| Diazo component | CC | Shade on acetate rayon |
|---|---|---|
| 2-amino-6-carboethoxybenzothiazole | (1) | Ruby. |
|  | (2) | Scarlet. |
|  | (3) | Red. |
|  | (4) | Red. |
|  | (5) | Red. |
|  | (6) | Red. |
|  | (7) | Red. |
|  | (8) | Red. |
|  | (9) | Ruby. |
| 3-methylmercapto-5-aminothiadiazole-1,2,4 | (12) | Rose. |
|  | (13) | Ruby. |
|  | (14) | Do. |
| 3-amino-5-nitrobenzoisothiazole-2,1 | (12) | Violet. |
|  | (13) | Blue. |
|  | (14) | Do. |

What I claim is:
1. A water-insoluble p-aminoazo dye having the formula

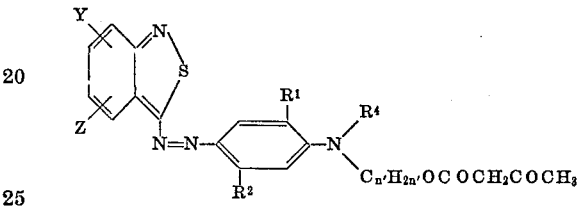

where

Z is hydrogen, chlorine, bromine, nitro, methylsulfonyl, carbomethoxy or carboethoxy,
Y is hydrogen or bromine,
$R^1$ is hydrogen, methyl, ethyl, methoxy or ethoxy,
$R^2$ is hydrogen, chlorine, methyl, ethyl, methoxy, ethoxy, acetylamino, or propionylamino,
$n'$ is one of the integers 2 and 3,
$R^4$ is the radical having the formula $$C_mH_{2m}OCOCH_2COCH_3 \text{ or } C_mH_{2m}X$$

$m$ is one of the integers 1, 2, 3 and 4 and
X is hydrogen, hydroxy, cyano, methoxy or ethoxy.

2. A water-insoluble p-aminoazo dye as claimed in claim 1 and having the formula:

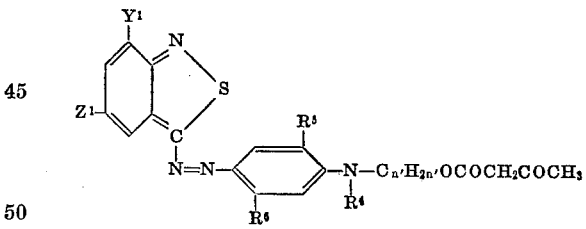

where $Z^1$ denotes bromine or nitro,
$Y^1$ denotes hydrogen or bromine,
$R^5$ denotes hydrogen, methoxy or ethoxy,
$R^6$ denotes hydrogen, methyl or acetylamino,
$n'$ denotes one of the integers 2 and 3 and
$R^4$ has the meanings given in claim 1.

3. The dye having the formula:

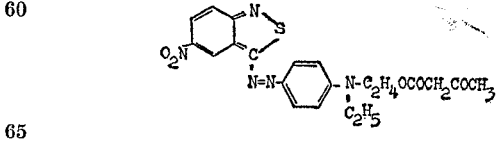

References Cited
UNITED STATES PATENTS
3,097,198  7/1963  Fishwick et al. _____ 260—207.1

JOSEPH REBOLD, Primary Examiner
D. M. PAPUGA, Assistant Examiner

U.S. Cl. X.R.
260—483

PO-1050
(5/69)

UNITED STATES PATENT OFFICE
CERTIFICATE OF CORRECTION

Patent No. 3,658,784                   Dated April 25, 1972

Inventor(s) Guenther Lange

It is certified that error appears in the above-identified patent and that said Letters Patent are hereby corrected as shown below:

Column 1, lines 24 to 26, that portion of the formula reading "$N-R^3 \atop R^4$" should read -- $N-R^3 \atop R^4$ --.

Column 4, line 37, "12%" should read -- 12.7% --.

Signed and sealed this 29th day of August 1972.

(SEAL)
Attest:

EDWARD M. FLETCHER, JR.
Attesting Officer

ROBERT GOTTSCHALK
Commissioner of Patents